US009724901B2

(12) United States Patent
Lu

(10) Patent No.: US 9,724,901 B2
(45) Date of Patent: Aug. 8, 2017

(54) BIAXIALLY ORIENTED METALLOCENE LINEAR LOW DENSITY POLYETHYLENE FILM, METHOD AND RESIN COMPOSITION FOR SAME

(71) Applicant: Jindal Films Americas LLC, LaGrange, GA (US)

(72) Inventor: Pang-Chia Lu, Pittsford, NY (US)

(73) Assignee: Jindal Films Europe Virton SPRL, Virton (BE)

( * ) Notice: Subject to any disclaimer, the term of this patent is extended or adjusted under 35 U.S.C. 154(b) by 587 days.

(21) Appl. No.: 14/207,062

(22) Filed: Mar. 12, 2014

(65) Prior Publication Data

US 2015/0258756 A1 Sep. 17, 2015

(51) Int. Cl.

| | |
|---|---|
| ***B32B 27/32*** | (2006.01) |
| ***C08L 23/08*** | (2006.01) |
| ***B32B 27/08*** | (2006.01) |
| ***B32B 27/30*** | (2006.01) |
| ***B32B 3/20*** | (2006.01) |

(52) U.S. Cl.

CPC .............. *B32B 27/327* (2013.01); *B32B 3/20* (2013.01); *B32B 27/08* (2013.01); *B32B 27/308* (2013.01); *B32B 27/32* (2013.01); *C08L 23/0815* (2013.01); *B32B 2250/242* (2013.01); *B32B 2270/00* (2013.01); *B32B 2274/00* (2013.01); *B32B 2307/31* (2013.01); *B32B 2307/412* (2013.01); *B32B 2307/50* (2013.01); *B32B 2307/514* (2013.01); *C08L 2314/06* (2013.01); *Y10T 428/2495* (2015.01); *Y10T 428/31913* (2015.04)

(58) Field of Classification Search

CPC ........... C08L 23/0815; C08L 2205/025; C08L 2205/03; C08L 2314/06; B32B 27/327; Y10T 428/2495; Y10T 428/31913

USPC ................................ 428/212, 213, 220, 516

See application file for complete search history.

(56) References Cited

U.S. PATENT DOCUMENTS

| | | | |
|---|---|---|---|
| 6,870,010 B1 | 3/2005 | Lue et al. | |
| 7,265,183 B2 | 9/2007 | Jester | |
| 2003/0144426 A1 | 7/2003 | Williams | |
| 2006/0063454 A1* | 3/2006 | Chung | D06C 3/00 442/327 |
| 2011/0268979 A1* | 11/2011 | Ambroise | C08L 23/04 428/516 |
| 2012/0130019 A1 | 5/2012 | Karjala et al. | |
| 2012/0189830 A1* | 7/2012 | Niepelt | B32B 27/32 428/216 |

FOREIGN PATENT DOCUMENTS

| | | |
|---|---|---|
| EP | 0292894 B1 | 10/1994 |
| EP | 0675906 B1 | 2/1999 |

* cited by examiner

*Primary Examiner* — Aaron Austin
*Assistant Examiner* — Lawrence Ferguson
(74) *Attorney, Agent, or Firm* — Rao DeBoer Osterrieder, PLLC

(57) ABSTRACT

Embodiments provide extruded oriented low density polyethylene (LDPE) films. Embodiments provide methods for making extruded oriented low density polyethylene (LDPE) films. Embodiments provide resin compositions for extruded oriented low density polyethylene (LDPE) films.

18 Claims, 4 Drawing Sheets

| Experiment 1 | | | | | | | |
|---|---|---|---|---|---|---|---|
| sample # | Exceed-3512 | Exceed-1012 | Enable-2703 | Enable-3505 | Exceed-1018 | Exceed-3518 | Exceed-2018 |
| 1 | 20 | 75 | 5 | | | | |
| 2 | 20 | | | | | | 80 |
| 3 | 20 | 60 | 20 | | | | |
| 4 | 12.5 | 75 | 12.5 | | | | |
| 5 | 20 | 60 | | 20 | | | |
| 6 | | | | 12.5 | 75 | 12.5 | |
| 7 | | | | 20 | 60 | 20 | |

FIGURE 1

| Experiment 1 | | | | |
|---|---|---|---|---|
| | property | unit | sample-1 | sample-2 |
| barrier | water vapor barrier at standard conditions (100F, 90% RH) | g/100 $in^2$/day | 0.876 | 0.785 |
| optical | haze | % | 1.2 | 20 |
| physical | thickness | mil | 1.02 | 1.04 |
| | Elmendorf tear MD | g/mil | 61.4 | 27.2 |
| | Elmendorf tear TD | g/mil | 86.3 | 117 |
| | Gurley stiffness MD | mg | 0.76 | 0.84 |
| | Gurley stiffness TD | mg | 1.13 | 1.27 |
| | Young's modulus MD | kpsi | 28 | 42 |
| | Young's modulus TD | kpsi | 127 | 130 |
| | puncture | lbs | 2.5 | 1.4 |
| Seal | crimp seal at 60 psi, 0.75 sec dwell time, vertical jaws | g/in at 220°F | 21 | 75 |
| | | g/in at 230°F | 112 | 268 |

FIGURE 2

Experiment 2

| Resins | MI | MP, °C | MP, °F | density |
|---|---|---|---|---|
| Enable-2010 | 1 | 114 | 237 | 0.92 |
| Enable-2305 | 0.5 | 116 | 241 | 0.923 |
| Exceed-3512 | 3.5 | 113 | 235 | 0.912 |
| Exceed-1012 | 1 | 115 | 239 | 0.912 |
| LD-306 (5.5% VA) | 2 | 102 | 216 | 0.925 |
| LD-313NF (3% VA) | 2.5 | 107 | 225 | 0.925 |
| Exact-3131 | 3.5 | 94 | 201 | 0.9 |
| Exact-3132 | 1.2 | 96 | 205 | 0.9 |
| VMX-3980FL | 3.2 | 79 | 174 | 0.879 |
| VMX-6102FL | 1.5 | 102 | 216 | 0.863 |

Experiment 2

| sample # | core resin blend | | | | skin resin | | | | skin thickness |
|---|---|---|---|---|---|---|---|---|---|
| | Enable-2010 | Exceed-1012 | Exceed-3512 | Enable-2305 | Exact-3131 | Exact-3132 | VMX-3980 | VMX-6102 | |
| 1 | | 75 | 20 | 5 | | | | | 0 |
| 2 | 75 | | 20 | 5 | | | 50 | 50 | 5% |
| 3 | 75 | | 20 | 5 | | | 50 | 50 | 10% |
| 4 | 75 | | 20 | 5 | | | | 100 | 5% |
| 5 | 75 | | 20 | 5 | 50 | 50 | | | 5% |
| 6 | 75 | | 20 | 5 | 50 | 50 | | | 10% |
| 7 | 75 | | 20 | 5 | 50 | 50 | | | 15% |

FIGURE 4

Experiment 2

| | | | | tensile | | | | | | WVTR |
|---|---|---|---|---|---|---|---|---|---|---|
| sample # | gauge | blocking, 50C, 100 psi, 24-hr | haze | modulus, kpsi | | % elongation | | tensile at break, kpsi | | 100F/ 90%RH |
| | mil | g/in | % | MD | TD | MD | TD | MD | TD | $g/m^2/day$ |
| 1 | 1.5 | 2.3 | 1.1 | 26 | 80 | 378 | 77 | 11 | 27.2 | 8.7 |
| 2 | 2 | 11 | 6.8 | 54 | 96 | 438 | 55 | 9.2 | 19.4 | 8.1 |
| 3 | 2 | 20 | 4.5 | 55 | 96 | 445 | 45 | 9.1 | 18.9 | 8.1 |
| 4 | 1.7 | 202 | 5.2 | 58 | 106 | 410 | 64 | 8.6 | 22.1 | 8.1 |
| 5 | 1.6 | 4 | 6.1 | 58 | 108 | 445 | 45 | 8.5 | 20 | 8.1 |
| 6 | 1.5 | 4.5 | 4.7 | 62 | 118 | 446 | 64 | 10.1 | 23.7 | 8.1 |
| 7 | 1.7 | 4 | 4.8 | 58 | 97 | 456 | 59 | 8.3 | 20.9 | 8.1 |

FIGURE 5

| sample # | Lako Seal, 60 psi, 0.75 sec dwell, 20 sec cool, g/in | | | | | | Lako Hot Tack, 60 psi, 0.75 sec dwell, 0 sec cool, g/in | | | | | |
|---|---|---|---|---|---|---|---|---|---|---|---|---|
| | 140F | 160F | 180F | 200F | 220F | 240F | 140F | 160F | 180F | 200F | 220F | 240F |
| 1 | | | 16 | 16 | 145 | 685 | | | 28 | 41 | 74 | 77 |
| 2 | 140 | 960 | 1073 | 954 | 1038 | 712 | 68 | 149 | 328 | 289 | 189 | 100 |
| 3 | 220 | 1487 | 1900 | 1676 | 1636 | 925 | 101 | 262 | 330 | 340 | 170 | 109 |
| 4 | 390 | 654 | 1114 | 1136 | 1051 | 757 | 111 | 219 | 248 | 238 | 158 | 101 |
| 5 | | | 173 | 1409 | 1569 | 1402 | | | 60 | 155 | 394 | 131 |
| 6 | | | 285 | 1128 | 1601 | 1327 | | | 73 | 149 | 457 | 127 |
| 7 | | | 313 | 1132 | 1528 | 1317 | | | 81 | 174 | 349 | 111 |

FIGURE 6

| **Experiment 2** | | | | | |
|---|---|---|---|---|---|
| sample # | puncture force | | | | |
| | peak load, g | peak load, lb. | elongation at break, mm | break load, N | energy to break, J |
| 1 | | | | | |
| 2 | 2726 | 6.0 | 18.2 | 26.7 | 0.10 |
| 3 | 3073 | 6.7 | 18.8 | 30.1 | 0.12 |
| 4 | 2996 | 6.6 | 18.9 | 29.4 | 0.12 |
| 5 | | | | | |
| 6 | | | | | |
| 7 | | | | | |
| with 2-mm test probe | | | | | |

FIGURE 7

BIAXIALLY ORIENTED METALLOCENE LINEAR LOW DENSITY POLYETHYLENE FILM, METHOD AND RESIN COMPOSITION FOR SAME

REFERENCE TO RELATED APPLICATIONS

None.

FIELD

The disclosure relates to oriented polyethylene films.

BACKGROUND

Polyolefin films are used in applications such as, for example, packaging. Un-oriented (cast or blown) polyethylene films generally have mediocre properties as packaging materials. More desirable properties in packaging material have been obtained using biaxially oriented films. Biaxially oriented polyethylene films have found much greater success and use than biaxially oriented polypropylene films.

SUMMARY OF DISCLOSURE

Embodiments of the present disclosure provide improved oriented linear low density, polyethylene (LLDPE) films, methods for making the same, and resin compositions for the same. Embodiments provide improved biaxially oriented metallocene linear low density polyethylene (mLLDPE) films, methods for making the same, and resin compositions for the same. Embodiments provide LLDPE films having improved clarity, reduced film thickness, and improved physical properties such as, for example, tensile modulus, stiffness qualities, and tear strength.

BRIEF DESCRIPTION OF FIGURES

So that the manner in which the above-recited and other features, advantages and objects of the present disclosure are attained and may be understood in detail, a more particular description of the disclosure, briefly summarized above, may be had by reference to the embodiments thereof, which are described in the Figures. It is to be noted, however, that the appended Figures illustrate only typical embodiments of this disclosure, and, therefore, are not to be considered limiting of the scope of this disclosure, for the disclosure may admit to other equally effective embodiments. The accompanying Figures, are incorporated into and constitute part of this specification.

FIG. 1 identifies resin compositions by weight percent that were used in Experiment #1.

FIG. 2 identifies exemplary resin compositions according to embodiments, identified as Sample 1 and Sample 2, and their compositions and properties. These two samples were used in Experiment 1.

FIG. 3 identifies exemplary resin compositions for embodiments used in Experiment #2, along with melt flow index, melting points in Celsius and Fahrenheit, and density.

FIG. 4 identifies exemplary resin compositions according to embodiments, film gauge and film density, for exemplary compositions used in Experiment 2.

FIG. 5 identifies haze and tensile properties of samples according to embodiments and produced from resin compositions identified in FIG. 4.

FIG. 6 identifies seal and hot tack properties of samples according to embodiments and produced from resin compositions identified in FIG. 4.

FIG. 7 identifies puncture properties of samples according to embodiments and produced from resin compositions identified in FIG. 4.

DETAILED DESCRIPTION OF EMBODIMENTS

The following is a detailed description of exemplary embodiments of the disclosure depicted in the accompanying drawings. The embodiments are examples and are described in such detail as to clearly communicate the disclosure. However, the amount of detail offered is not intended to limit the anticipated variations of embodiments; on the contrary, the intention is to cover all modifications, equivalents, and alternatives falling within the spirit and scope of the disclosure and embodiments, as defined by the claims. The detailed descriptions below are designed to make such embodiments obvious to a person of ordinary skill in the art.

Embodiments provide oriented LLDPE films, methods for producing oriented LLDPE films, and resin compositions for LLDPE films. Embodiments provide biaxially oriented LLDPE films, methods for producing biaxially oriented LLDPE films, and resin compositions for biaxially oriented LLDPE films. Embodiments provide biaxially oriented metallocene LLDPE (m-LLDPE) films, methods for producing biaxially oriented m-LLDPE films, and resin compositions for biaxially oriented m-LLDPE films. Embodiments provide methods for producing improved biaxially oriented m-LLDPE films, for example, having thicknesses of approximately 1 to 2 mil, reduced haze such as, for example, 1% haze, improved tear strength, improved tensile modulus, improved stiffness qualities, improved moisture barrier properties, and reduced film thicknesses. The m-LLDPE films produced according to embodiments may provide films of reduced thickness having desirable physical properties associated with films of greater thickness ("down-gauging"), enable reduced manufacturing costs, and improved film products for end uses.

It is disadvantageous that biaxially oriented LLDPE films are unsuitable for heat sealing, and have relatively high crystallization and orientation of film surfaces that may contribute to such unsuitability for heat sealing. Embodiments disclosed herein provide oriented LLDPE films having improved capability, properties and suitability for heat sealing, reduced crystallization and improved film surfaces orientation. Embodiments provide resin compositions that may be selected, for example, to minimize or avoid problems such as, for example, melt disturbance. Embodiments provide, for example, improved resin compositions ("blends") and methods for producing oriented LLDPE films with reduced melt disturbances associated with the use of LDPE and LLDPE resin compositions, wherein for example LDPE, LLDPE, or both are eliminated or substantially eliminated from resin compositions.

Experiment 1

Embodiments will be further described with reference to the following non-limiting examples. When possible, standard ASTM tests were used to determine physical properties of the film.

Referring to FIG. 1, embodiments provide improved extruded LLDPE films, improved LLDPE and very low density polyethylene (VLDPE) resin compositions, and improved methods for making extruded LLDPE films. Embodiments provide, for example, improved extruded LLDPE films, and improved LLDPE resin compositions, having an average melt index (MI) of approximately 1. Embodiments provide improved LLDPE resin compositions, and film extruded therefrom, having an average melt index (MI) of approximately 1, and which may be blended with high and low molecular weight minor fractions to broaden the molecular weight distribution. In some embodiments, the high molecular weight fraction may have MI of less than 0.5.

The experiment was performed on a tenter orientation line with an orientation ratio set up for MDX of 3.5 and a TDX of 8 to 9. The die gap was set to 50-60 mil and produced a single layer film. The caster was set to 50-60 Celsius (° C.) or 122-140 Fahrenheit (° F.), an installed air cap, and a caster speed of 35 feet per minute (FPM). The machine direction orientation (MDO) was set at 85-88° C. or 185-190° F. The transverse direction orientation (TDO) starting condition was set to 244/237/230° F. with temperature in the pre-heat zone not to exceed 260° F. The line speed was targeted for 100 FPM. The film gauge was set at 1.5 mil. The produced films were tested for haze, water vapor transmission rate (WVTR), oxygen transmission rate (OTR), tensile, gauge, stiffness, and tear qualities.

The first sample (Sample 1) was a single layer film with resin blend as 75% Exceed-1012+20% Exceed-3512+5% Enable-2703. The second sample (Sample 2) was produced as a single layer film with resin blend of 80% Exceed-2018+ 20% Exceed 3512. (In this disclosure, Exceed 3812 may be used in any embodiment instead of or in addition to Exceed 3512.) These two samples were tested for the above-listed qualities, the results of which are reported in FIG. 2. It will be understood that Enable™ and Exceed™ products are metallocene ethylene-hexene copolymer resins and are commercially available from ExxonMobil Chemical Company, Houston, Tex., and that in embodiments where Enable™ or Exceed™ products may be used, any other suitable metallocene ethylene-hexene, ethylene-butene or ethylene-octene copolymer resins having comparable properties may be used.

Both samples (i.e., Samples 1 and 2) produced by the first experiment did not seem to be readily heat-sealable. Without limiting any of the subject matter and embodiments disclosed herein, it may be theorized that the two samples were not readily heat sealable because of high orientation and crystallization on the film surfaces. Without limiting any of the subject matter and embodiments disclosed herein, in other embodiments, an LLDPE resin composition may include a plasticizer or blend thereof, such as, for example, hydrocarbon (HC) resins, Exact™ ethylene α-olefin copolymer resins, or another plasticizer or mixture thereof. It will be understood that Exact™ products are ethylene-based hexene plastomer resins and are commercially available from ExxonMobil Chemical Company, Houston, Tex., and that in embodiments where Exact™ products may be used, any other suitable ethylene-based hexane, butane, or octene plastomer resins having comparable properties may be used.

A second experimental production run, described in Experiment 2, was executed with a water bath basesheet quenching.

Experiment 2

Referring to FIG. 3, a second series of trials were prepared to produce a biaxially oriented LLDPE film that is readily heat sealed and useful for packaging applications. Particular process conditions were as follows: the film was a two-layer A/B co-extrusion film structure with skin layer at 5%, 10%, 15% on one side; the caster temperature was set at 90° F. with water bath at 80° F. The initial orientation ratio was set to MDX=3.5 and TDX=8. A reduced skin die was used with a die gap of 50-60 mil. The MDO was set to 85-88° C. or 187° F. The TDO oven temperature was set at 246/240/230° F. The caster speed was set to 32-45 FPM, depending on the output of the resin. The semiworks line speed was targeted for 105 FPM.

Illustrated in FIG. 3 are resin compositions according to embodiments including LLDPE and which were particularly used in Experiment 2. FIG. 3 also identifies the melt flow index in dg/s, melting points in Celsius and Fahrenheit, and density of the resin compositions in g/cm$^3$ according to embodiments and used in Experiment 2.

Sample 1 of the production in Experiment 2 used 75% Exceed-1012 as the main resin in the core layer as shown in FIG. 4. The remaining samples produced in Experiment 2 used 75% Enable-2010 as the main resin in the core layer as shown in FIG. 4. Exceed-1012 may be interchangeable with Enable-2010 in this experiment, although they may have slight molecular structural differences. Enable™ and Exceed™ products are metallocene ethylene-hexene copolymer resins and are commercially available from ExxonMobil Chemical Company, Houston, Tex. In embodiments where Enable™ or Exceed™ products may be used, any other suitable metallocene ethylene-hexene, ethylene-butene, or ethylene-octene copolymer resins having comparable properties may be used.

Experiment 2 began the first run with the main extruder at 510° F. and the die at 500° F.; the MDO was set to 187° F.; the TDO started at 246/238/230° F.; the caster was set to 140° F. and the water bath at 90° F.

The second run in Experiment 2 began with a skin blend 50/50 ratio of VMX-3980 and VMX-6102. The VMX™ (Vistamaxx™ VMX™) family of products is suitable commercially available propylene-based elastomer products, and is available from ExxonMobil Chemical Company (Houston, Tex.). It will be understood in embodiments where Vistamaxx™ VMX™ products may be used, any suitable propylene-based elastomer having comparable properties may be used in this run or other runs of Experiment 2. The core layer comprised Enable-2010, Exceed-3512, and Enable-2305 in a 75/20/5 blend ratio, as described in the FIGS. 4-7 as sample 2. Instead of Enable-2305, Enable-2703 or Enable-2705 may be used. Samples 2 and 3 were collected with different skin layer thickness as listed in FIGS. 4-7, wherein the skin thickness is measured as a percentage of the total thickness of the film.

The third run in Experiment 2 began with a 100% VMX-6102 for the skin. Sample 4 was collected, as indicated in FIGS. 4-7.

The next run of Experiment 2 used a 50/50 ratio blend of Exact-3131 and Exact-3132 with 1% slip/antiblock-masterbatch (5% slip, 35% talc in VMX-3980 carrier resin) added to the composition.

For samples 5, 6, 7, the caster and water bath temperatures were reset to 90° F. and 80° F., respectively. The skin extruder revolutions per minute was set to 3 different speeds to control the skin layer thickness, and samples 5, 6, 7 were collected. Each sample and its tested properties are indicated in FIGS. 4-7.

Set forth in FIG. 4 are the core resin compositions contemplated for production in Example 2. The production run of Experiment 2 produced sample numbers 1-7 as identified in FIG. 4. Embodiments provide extruded multilayer film structures as described. Although tests were performed for two-layer A/B coextruded multilayer film structures, other example embodiments may include a three-layer A/C/B film structure, a four-layer A/C/B/D film structures, and so forth without departing from this disclosure and its claims. Furthermore, although layers thereof may have different compositions and functions, in some embodiments layer A may be a sealant skin or sealable skin; layer C may include filler material; layer B may include a core material, or main component, including LLDPE blends as further described below; and layer D may be another skin layer. For example, layer C's filler material may include recycled material. Additionally and alternatively to layer D being another skin layer, layer D may also be or include material to further enhance the film's properties, such as, for example, material for improved coating or metal adhesion.

It is noted that the skin layer resins should have a melt index that is higher than the main component in the core resin blend. According to example embodiments, multilayer film structures may include layer A that may be a co-extruded sealant skin (or "sealable skin") that includes a suitable low melting material and a melt viscosity that is slightly lower than the viscosity of core material of layer B under the production process condition and temperature, comprising one or more components, e.g., LLDPE(s). Suitable low melting materials may include, for example, substantially single component or blends of PE plastomers, such as, Exact™ resin (ExxonMobil Chemical, Houston, Tex.) or PP plastomers, such as, Vistamaxx™ resin (ExxonMobil Chemical, Houston, Tex.). Other suitable Layer A heat sealing material may include ethylene vinyl acetate (EVA), DuPont™ Surlyn®, ethylene methyl acrylate (EMA), very low density PE, other ethylene-based polymers, other ethylene-based polymers copolymers, and blends of the foregoing. Layer B's single or blend of component(s) may provide desired rheology control properties, such as, avoiding melt disturbance and/or uneven layer distribution. In some embodiments, layer A may include a single plastomer or a blend of plastomers selected from the group consisting of PP, PE or combinations thereof. The blending ratio of components of blends may be in any suitable proportions summing 100%. Furthermore, depending on the melt viscosity of the core layer (or, if different blends are included as described, then, different viscosities), the skin may include a single component plastomer or a blend of plastomers. In other embodiments, layer A may include a blend of components selected from the foregoing group, which may have different respective melt viscosities, wherein the blended components may have a resulting, i.e., blended, melt viscosity that is less than the melt viscosity of the core material of layer B. In some embodiments as described, layer A may be a sealant skin including a suitable blend of a plurality of components, wherein a first component thereof has desirable properties, such as, desired heat sealing properties. In such embodiments, the same first component may have a melting point that is too low for the first component to be used alone, i.e., as the single component of a sealant skin, because, for example, such a sealant skin would stick to hot MDO roll surfaces during processing. Layer A may include at least one other component (e.g., a second component) having a melting point higher than the MDO roll temperature, such that the resulting blend will not stick to the hot MDO roll surfaces. In an exemplary embodiment, layer A may include a first component that is Vistamaxx™ 3980 (ExxonMobil Chemical Company, Houston, Tex.), which may provide desirable heat sealing properties, but also has a low melting point that, if used alone as the single component of a sealant skin, might stick to hot MDO rolls. In the same exemplary embodiment, layer A may include a second component that is Vistamaxx™ 6102 (ExxonMobil Chemical Company, Houston, Tex.), which has a higher melting point, and, thus, will not stick to hot MDO roll surfaces. In such an exemplary embodiment, layer A may include a suitable blend ratio of Vistamaxx™ 3980 and Vistamaxx™ 6102 that will not stick to the hot MDO roll surfaces during processing.

Embodiments may provide multilayer film structures with layer B that may have a core material, or a main component, that may include LLDPE blends. These LLDPE blends may have a broad molecular weight distribution for improved melt elasticity at elevated temperature during TD stretching. In one example, a three component LLDPE blends may be selected with one low, one medium, and one high molecular weight materials. The low molecular weight component may be present in a ratio of about 5-30% of the blend. The medium molecular weight component may be present in a ratio of about 40-90% of the blend. The high molecular weight component may be present in a ratio of about 5-30% of the blend. For example, a suitable three-component blend may have a blend ratio of about 5/90/5 of low/medium/high molecular weight components. In other example, suitable three-component blends may have blend ratios of about 10/85/5, about 15/80/5, or about 20/75/5.

Example embodiments may further include film additives, such as, but not limited to, slip additives, antiblock additives, pigments, processing aids, and/or other additives. Additives may be added to control surface coefficient of friction, treatment, printing, and other properties. Example slip additives may include erucamide, stearamide, silicone oil, etc. Example antiblock additives may include polymethyl methacrylate, talc, silica, etc. Example pigments may include titanium dioxide or calcium carbonate. Example processing aids may include fluoropolymers, etc. Other additives may include polyethylene-based or polypropylene-based resins grafted with maleic anhydride, antistatic additives, antifog additives, etc. In example embodiments, additives may be present in amounts from about 0.01% to about 5% of the resin blends for a multilayer film structure.

FIG. 5 identifies the haze and tensile properties of samples 1-7 produced from the compositions identified in FIG. 4.

FIG. 6 identifies the seal and hot tack properties of samples 1-7 produced from the compositions identified in FIG. 4. Samples showed excellent low seal initiation temperature and strong seals.

FIG. 7 identifies the puncture properties of samples 1-7 produced from the compositions identified in FIG. 4.

Experiment 2 produced 1.5-2 mil biaxially oriented coextruded m-LLDPE films with an A/B structure with a sealant on the water bath side.

The core resin blends created and discussed in this disclosure surprisingly show that core resin blends based on selected combinations of more than one mLLDPE or mLDPE resins having particular melt indices result in a blend of polymers having a broad molecular weight distribution, including the possibility of bimodal and trimodal distributions. By comparison to the blends herein, single site metallocene catalysts generally produce polymers with a narrow molecular weight distribution, i.e., Mw/Mn to be around 2 (weight-average molecular weight divided by number-average molecular weight, wherein Mw and Mn both can be measured by gel permeation chromatography (GPC)). Narrow molecular weight distributions deliver limited molecular chain entanglements in order to provide needed melt elasticity. The enhanced melt elasticity may be desired during film orientation or stretching at elevated temperature in order to assist in maintaining film integrity without breakage. When Mw/Mn reaches around 4 or >4, i.e., a broad molecular weight distribution, the polymer melt or blend may have enhanced polymer chain entanglement, and, thus, improved melt elasticity at elevated temperatures. This improved melt elasticity enables improved TD stretch at high temperatures, as well as reduced melt fracture during extrusion. As shown in the experiments, when molecular weight distribution>4 by blending together three m-LLDPE resins, the three-component blends showed greatly improved melt elasticity and film orientation through tenter orientation as compared to narrow molecular weight distribution components and blends.

While certain exemplary embodiments, compositions, and methods have been described in detail and shown in the figures, it is to be understood that such embodiments, compositions, and methods are merely illustrative of the claims set forth below and do not limit the scope of the following claims.

What is claimed is:

1. An extruded, oriented, multilayer, film structure comprising:

a core layer formed of a core resin composition comprising, by weight, a blend consisting essentially, by weight, of 50-90% of a first metallocene linear low density polyethylene (mLLDPE) resin having a melt index from about 0.8 dg/s to about 2 dg/s, about 5-25% of a second mLLDPE resin having melt index from about 0.1 dg/s to about 0.8 dg/s, and about 5-25% of a third mLLDPE resin having a melt index from about 2 dg/s to about 10 dg/s; and a skin layer having a skin resin composition comprising one or more polyolefin plastomers, wherein the skin layer has a thickness of approximately 3% to 20% as compared to a total thickness of the extruded, oriented, multilayer, film structure.

2. The extruded, oriented, multilayer, film structure of claim 1, wherein the one or more polyolefin plastomers comprise one or more metallocene propylene-based elastomer resins, ethylene vinyl acetate, ethylene acid copolymer, ethylene methyl acrylate, polyethylene-based polymer elastomer resins, polyethylene-based copolymer elastomer resins, and blends thereof.

3. The extruded, oriented, multilayer, film structure of claim 1, wherein the one or more polyolefin plastomers have a melting index higher than the first mLLDPE resin in the core layer.

4. The extruded, oriented, multilayer, film structure of claim 1, wherein the one or more polyolefin plastomers comprises at least one polyethylene-based plastomer.

5. The extruded, oriented, multilayer, film structure of claim 1, wherein the skin resin comprises about 0-100% by weight of a first metallocene propylene-based elastomer resin and about 100-0% by weight of a second metallocene propylene-based elastomer resin.

6. The extruded, oriented, multilayer, film structure of claim 1, wherein the blend comprises about 60-90% of the first mLLDPE resin, about 5-20% of the second mLLDPE resin, and about 5-20% of the third mLLDPE resin.

7. The extruded, oriented, multilayer, film structure of claim 1, wherein the blend has a molecular weight distribution of at least 4.

8. The extruded, oriented, multilayer, film structure of claim 1, wherein the skin layer is heat-sealable.

9. The extruded, oriented, multilayer, film structure of claim 1, wherein a melt viscosity of the core layer exceeds that of the skin layer.

10. The extruded, oriented, multilayer, film structure of claim 1, wherein at least one component of the core layer comprise a melting point with a temperature higher than a machine direction orientation (MDO) roll.

11. The extruded, oriented, multilayer, film structure of claim 1, further comprising one or more additional layers proximate to the core layer, the skin layer, and combinations thereof, and, optionally further comprising one or more additives to the one or more additional layers.

12. The extruded, oriented, multilayer, film structure of claim 1, wherein the skin layer has a higher melt index than a main component of the blend in the core layer.

13. The extruded, oriented, multilayer, film structure of claim 1 having a haze of less than 10%.

14. The extruded, oriented, multilayer, film structure of claim 1, wherein a tensile strength at break is at least 8 kpsi in a machine direction, at least 18 kpsi in a transverse direction, and combinations thereof.

15. The extruded, oriented, multilayer, film structure of claim 1 having a water vapor transmission rate of less than 9 $g/m^2/day$ at 100° F. at 90% relative humidity.

16. The extruded, oriented, multilayer, film structure of claim 1 having seal strength of at least 650 g/in at 60 psi and 0.75 sec dwell time at 160° F.

17. The extruded, oriented, multilayer, film structure of claim 1 having a hot tack of at least 65 g/in at 60 psi and 0.75 sec dwell time at 140° F.

18. The extruded, oriented, multilayer, film structure of claim 1 having a break load or a puncture force of at least 20 N.

* * * * *